United States Patent
Watanabe et al.

(10) Patent No.: US 10,532,289 B2
(45) Date of Patent: Jan. 14, 2020

(54) PROGRAM, CONTROL METHOD, AND INFORMATION PROCESSING APPARATUS

(71) Applicant: GREE, Inc., Tokyo (JP)

(72) Inventors: Taku Watanabe, Tokyo (JP); Norifumi Okumura, Tokyo (JP); Takayuki Itoh, Tokyo (JP); Kanji Uemura, Tokyo (JP); Naoko Hanada, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 16/019,633

(22) Filed: Jun. 27, 2018

(65) Prior Publication Data

US 2019/0001225 A1 Jan. 3, 2019

(30) Foreign Application Priority Data

Jun. 30, 2017 (JP) ................................ 2017-128868
Dec. 4, 2017 (JP) ................................ 2017-232595

(51) Int. Cl.
| | |
|---|---|
| A63F 13/00 | (2014.01) |
| A63F 13/80 | (2014.01) |
| A63F 13/58 | (2014.01) |
| A63F 13/48 | (2014.01) |
| A63F 13/33 | (2014.01) |

(52) U.S. Cl.
CPC .............. *A63F 13/80* (2014.09); *A63F 13/33* (2014.09); *A63F 13/48* (2014.09); *A63F 13/58* (2014.09)

(58) Field of Classification Search
None
See application file for complete search history.

(56) References Cited

U.S. PATENT DOCUMENTS

2004/0143852 A1* 7/2004 Meyers .................. A63F 13/12
                                                                725/133
2014/0329602 A1 11/2014 Hisaoka et al.

FOREIGN PATENT DOCUMENTS

JP          5477929 B1      4/2014
JP       2014-168586 A      9/2014
(Continued)

OTHER PUBLICATIONS

Office Action dated Mar. 5, 2019 of corresponding Japanese Application No. 2017-232595; 6 pages.
(Continued)

*Primary Examiner* — Paul A D'Agostino
(74) *Attorney, Agent, or Firm* — Maier & Maier, PLLC

(57) ABSTRACT

A program, a control method, and an information processing apparatus capable of improving excitement of a game. An information processing apparatus (including a server device and a terminal device) executing a process of a game including game content for performing a battle using a plurality of game media may store the plurality of game media selected by a user of the game in association with the user, display some game media among the plurality of game media in a field area and proceed with the game content, and perform a process for providing a cooperation effect including changing of a parameter of a first game medium included in some game media when the first game medium satisfies a predetermined condition and a second game medium in a predetermined relationship with the first game medium and not included in some game media is included in the plurality of game media.

10 Claims, 10 Drawing Sheets

(56) References Cited

FOREIGN PATENT DOCUMENTS

| JP | 2015-116469 A | 6/2015 |
|---|---|---|
| JP | 2016-202418 A | 12/2016 |

OTHER PUBLICATIONS

Office Action dated Sep. 19, 2017 of corresponding Japanese application No. JP2017-128868; 6 pgs.
"Mobile Suit Gundam 0083 Card Builder—Both Male Crash—", "Dengeki Arcade Card Game vol. 6 Dengeki PlayStation 5/9 Supplementary Issue", Media Works, May 9, 2008, vol. 14, No. 17, p. 72-79; 33 pgs.

\* cited by examiner

| USER ID | POSSESSED CARD INFORMATION |
|---|---|
| user01 | * * * * |
| user02 | * * * * |
| user03 | * * * * |
| ⋮ | ⋮ |

FIG.3

| CARD ID | CHARACTER ID | LEVEL | RARITY | ATTRIBUTE | PARAMETER | UNIT SKILL ID | ⋮ |
|---|---|---|---|---|---|---|---|
| 1 | A | 1 | 2 | FIRE | HP:1000<br>MP:1000<br>AT:1000<br>DF:1000 | S1 | ⋮ |
| 2 | B | 5 | 3 | WATER | HP:2000<br>MP:2000<br>AT:2000<br>DF:2000 | S2 | ⋮ |
| 3 | C | 10 | 4 | LIGHT | HP:3000<br>MP:3000<br>AT:3000<br>DF:3000 | S3 | ⋮ |
| ⋯ | ⋯ | ⋯ | ⋯ | ⋯ | ⋯ | ⋯ | ⋮ |
| 20 | A | 3 | 4 | WIND | HP:3000<br>MP:3000<br>AT:3000<br>DF:3000 | S20 | ⋮ |
| ⋯ | ⋯ | ⋯ | ⋯ | ⋯ | ⋯ | ⋯ | ⋮ |

| COOPERATION SKILL ID | COOPERATION SKILL NAME | TARGET CHARACTER | TRIGGER TIMING | TRIGGER PROBABILITY | UPPER LIMIT OF NUMBER OF TIMES OF TRIGGERING | EFFECT | |
|---|---|---|---|---|---|---|---|
| CS1 | **** | A,B | C1,C2,C4 | 50% | 1 | **** | ⋮ |
| CS2 | **** | A,B,C | C1 | 20% | 3 | **** | ⋮ |
| CS3 | **** | C,D | C3,C4,C5 | 33% | 2 | **** | ⋮ |
| ⋯ | ⋯ | ⋯ | ⋯ | ⋯ | ⋯ | ⋯ | ⋮ |
| CS20 | **** | A,C | C1-C5 | 70% | 1 | **** | ⋮ |
| ⋯ | ⋯ | ⋯ | ⋯ | ⋯ | ⋯ | ⋯ | ⋮ |

~112

| GAME SITUATION ID | CONTENT |
|---|---|
| C1 | BATTLE-DISABLED STATE |
| C2 | SIX COMBOS ACHIEVED |
| C3 | UNIT SKILL TRIGGERED |
| C4 | COUNTER ATTACK EXECUTED |
| C5 | TEAM ATTACK EXECUTED |
| ⋮ | ⋮ |

FIG.7

| COOPERATION SKILL ID | COOPERATION SKILL NAME | TARGET CHARACTER | TRIGGER TIMING | TRIGGER PROBABILITY | UPPER LIMIT OF NUMBER OF TIMES OF TRIGGERING | EFFECT |
|---|---|---|---|---|---|---|
| CS1 | **** | A,B | C1,C2,C4 | 50% | 1 | **** |
| CS2 | **** | A,B,C | C1 | 20% | 3 | **** |
| CS3 | **** | C,D | C3,C4,C5 | 33% | 2 | **** |
| ... | ... | ... | ... | ... | ... | ... |
| CS20 | **** | A,C | C1-C5 | 70% | 1 | **** |
| ... | ... | ... | ... | ... | ... | ... |

112

(1) CS1
(2) CS2
(3) CS20

(12) United States Patent

PROGRAM, CONTROL METHOD, AND INFORMATION PROCESSING APPARATUS

FIELD

The present invention relates to a program, a control method, and an information processing apparatus.

BACKGROUND

In recent years, so-called social games in which a plurality of players (users) can mutually communicate have become known in the art, in the form of games provided to a mobile terminal via a communication network. In a social game, for example, a quest may be executed using a deck (team) including a character selected by a user, or a battle may be performed with another user or a non-player character (NPC).

Which character is to be selected to make a deck may be an important part of a user's game strategy. For example, Patent Literature 1 discloses that a different attack selected from the attacks of individual characters is performed as a "cooperation skill" when a predetermined combination of characters is included in the deck.

[Patent Literature 1] cited above, is JP-A-2016-202418.

SUMMARY

One condition under which the cooperation skill described in Patent Literature 1 is triggered is that a predetermined character combination is included in the deck. That is, the trigger timing of the cooperation skill described in Patent Literature 1 is unrelated to a scenario (story) or a game situation in the game. For this reason, in order to further enhance excitement of the game, there is room for further improvement with regard to the cooperation skill.

An object of the disclosure in view of such circumstances is to provide a program, a control method, and an information processing apparatus capable of improving excitement of a game.

A program according to an exemplary embodiment may cause an information processing apparatus executing a process of a game, including game content for performing a battle, using a plurality of game media, to execute a step of storing the plurality of game media selected by a user of the game in association with the user, a step of displaying some game media among the plurality of game media in a field area and proceeding with the game content, and a step of performing a process of a cooperation effect including changing of a parameter of a first game medium included in some game media when the first game medium satisfies a predetermined condition and a second game medium in a predetermined relationship with the first game medium and not included in some game media is included in the plurality of game media.

A control method according to an exemplary embodiment may be a method of controlling an information processing apparatus executing a process of a game including game content for performing a battle using a plurality of game media, including a step of storing the plurality of game media selected by a user of the game in association with the user, a step of displaying some game media among the plurality of game media in a field area and proceeding with the game content, and a step of performing a process of a cooperation effect including changing of a parameter of a first game medium included in some game media when the first game medium satisfies a predetermined condition and a second game medium in a predetermined relationship with the first game medium and not included in some game media is included in the plurality of game media.

An information processing apparatus according to an exemplary embodiment may be an information processing apparatus executing a process of a game including game content for performing a battle using a plurality of game media, including a storage unit that stores the plurality of game media selected by a user of the game in association with the user, and a control unit, in which the control unit displays some game media among the plurality of game media in a field area and proceeds with the game content, and performs a process of a cooperation effect including changing of a parameter of a first game medium included in some game media when the first game medium satisfies a predetermined condition and a second game medium in a predetermined relationship with the first game medium and not included in some game media is included in the plurality of game media.

According to the disclosure, a program, a control method, and an information processing apparatus capable of improving excitement of a game may be provided.

BRIEF DESCRIPTION OF THE DRAWINGS

FIG. 3 is an exemplary embodiment of a diagram illustrating information on the cards possessed by a user;

FIG. 4 is an exemplary embodiment of a diagram illustrating information on a cooperation skill;

FIG. 7 is an exemplary embodiment of a diagram for description of a process of extracting a candidate for the cooperation skill;

DETAILED DESCRIPTION

Figure 1:
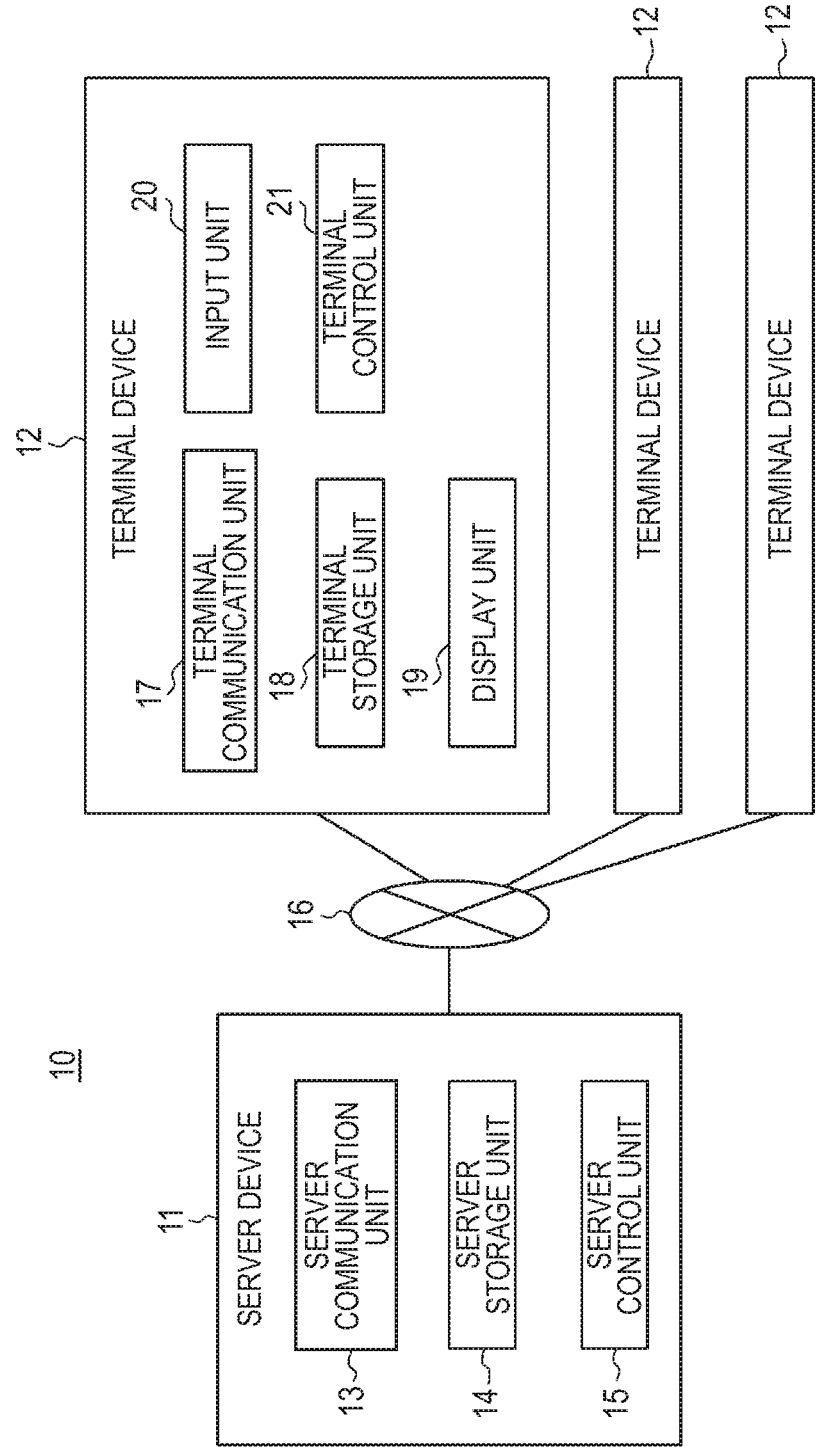
FIG. 1 is an exemplary embodiment of a diagram describing of a game system including an information processing apparatus.

An exemplary embodiment of a game system may first be outlined. As illustrated in FIG. 1, a game system 10 includes a server device 11 and a plurality of terminal devices 12. In FIG. 1, for convenience, three terminal devices 12 are illustrated. However, the number of terminal devices 12 may be one or more.

For example, the server device 11 may be an information processing apparatus managed by a game operator. For example, each of the terminal devices 12 may be an information processing apparatus used by a user such as a mobile phone, a smartphone, a tablet terminal, a personal computer (PC), a game device, etc. For example, the server device 11 and the terminal device 12 may be connected via a network 16 such as the Internet so that communication is allowed.

For example, the server device 11 and the terminal device 12 may collaborate to execute various processes related to a game.

Discussing next the outline of an exemplary embodiment of a game, a game executed in the game system 10 may include various game contents. At least some of the various game contents may be executed using a game medium.

The game medium may be electronic data used for a game, and may include, for example, an arbitrary medium such as a card, an item, a virtual currency, a ticket, a character, an avatar, etc. In addition, the game medium may be electronic data that can be retrieved, owned, used, managed, exchanged, combined, strengthened, sold, discarded, donated, etc. in the game by the user. A mode of use of the game medium may not be limited to that specified in this specification.

Hereinafter, unless otherwise stated, "a game medium owned by a user" indicates a game medium associated with a user ID that can uniquely identify the user as an owned game medium. Moreover, "giving a game medium to a user" indicates that a game medium may be associated with a user ID as an owned game medium. In addition, "to sell game content owned by a user" means to cancel association between a user ID and an owned game medium and associate another game medium (for example, a virtual currency, an item, etc.) as an owned game medium with the user ID.

The game content may be content that can be played by the user in the game and may include, for example, a quest, a mission, a mini game, training, strengthening and combining of game media, a game medium acquisition event, a virtual space search event, a match event with an opponent (for example, another user, an enemy character, an enemy building, etc.), etc. For example, when it is determined that at least one predetermined condition (game task) set for each game content has been successfully achieved, for example, a game medium, etc. may be given as a reward to the user. For example, an arbitrary task according to content of the game content such as a task of winning a match against the enemy character, a task of reaching a goal point in a virtual space, etc. may be adopted as the game task. In addition, achieving a specific task (completed task) among one or more game tasks set in the game content may be also referred to as completing of the game content. When the user who plays the game content succeeds in achieving the completed task, it may be determined that the game content has been completed, and the game content may be ended.

Various game contents may include a game content for a single player and a game content for multiple players. The game content for the single player may be game content (for example, game content for one person) executed based on a user operation on one terminal device 12 used by one user. The one terminal device 12 alone executes or the one terminal device 12 and the server device 11 cooperate to execute game content for the single player. Meanwhile, the game content for the multiple players may be game content (for example, game content for a plurality of people) common to two or more users executed based on a user operation on two or more terminal devices 12 used by two or more users, respectively. For example, the game content common to two or more users may include game content in which at least a part of a progress process, a processing result, etc. of the game content may be commonly applied to the two or more users. Two or more terminal devices 12 cooperate, or two or more terminal devices 12 and the server device 11 cooperate to execute the game content for the multiple players.

In the present embodiment, the game may include game content in which the user operates the game medium to play a match. Hereinafter, the game content will be also referred to as match content. For example, even though the game medium used for the match content may include a character owned by the user in the game, the invention is not limited thereto. Further, for example, even though the opponent may include an enemy character such as an NPC, the invention is not limited thereto. For example, in the game content for the multiple players, a game medium operated by another user may be determined for an opponent.

For example, one match content of the game according to the present embodiment selects a predetermined number of characters from among characters owned by the user. Here, it may be possible for the user to improve matching ability of the deck by selecting a helper character (also referred to as a "helper", simply "assistant") and adding the selected helper character to the deck. The helper character may be a character associated with a game medium (for example, a card) owned by another user, or a character prepared by a game program. Further, the user may play a match against an enemy character using some or all of characters of the deck. Here, forming a deck means to make a party (team or group) to play a match with a character selected from the character owned by the user and the helper character.

Looking next at the configuration of the server device, the server device 11 may include a server communication unit 13, a server storage unit 14, and a server control unit 15.

The server communication unit 13 may include an interface that communicates with an external device wirelessly or by wire and transmits and receives information. For example, the server communication unit 13 may include a wireless local area network (LAN) communication module, a wired LAN communication module, etc. The server communication unit 13 can transmit and receive information to and from the terminal device 12 via the network 16.

For example, the server storage unit 14 may include a primary storage device and a secondary storage device. For example, the server storage unit 14 may include a semiconductor memory, a magnetic memory, an optical memory, etc. The server storage unit 14 may store various information and programs necessary for providing and controlling the game. At least a part of the information and the programs stored in the server storage unit 14 may be shared and synchronized with the terminal device 12. For example, the server storage unit 14 may store information on one or more users.

Further, the server storage unit 14 may store information on the enemy character. The enemy character may be used as an opponent of the character used by the user in the match. The information on the enemy character may include arbitrary information unique to the enemy character. For example, the information on the enemy character may include an ID (identifier) uniquely identifying the enemy character, a level, attribute, HP (hit point), MP (magic point), AT (attack power), and DF (defense force), etc.

The server control unit 15 may include at least one of one or more general-purpose processors that realize a specific function by reading a specific program and one or more dedicated processors specialized for specific processing. The server control unit 15 may control an operation of the entire server device 11.

The server control unit 15 may store various information and programs necessary for game processing in the server storage unit 14. The information necessary for game processing may include information on the user, information on the enemy character, information necessary for executing the match, etc.

The server control unit 15 exchanges information via the server communication unit 13. For example, the server control unit 15 may transmit at least a part of the information stored in the server storage unit 14 to the terminal device 12. In this way, the information stored in the server storage unit 14 and the information stored in the terminal device 12 may be shared and synchronized. For example, a timing at which the information is shared and synchronized may include a timing at which new information is stored in the server storage unit 14 and a timing at which the information stored in the server storage unit 14 is updated. However, the timing may be arbitrarily determined.

The server control unit 15 executes game processing in cooperation with the terminal device 12. For example, game processing may include a process of acquiring the game medium by the user proceeding with a game scenario. The game medium may correspond to a card or a character associated with the card. In addition, game processing may include a process of exchanging, selling, combining, etc. of an acquired card. In addition, game processing may include a process of matching against the enemy character by making a deck using a character associated with the card.

Looking next at an exemplary embodiment of the configuration of a terminal device, as illustrated in FIG. 1, the terminal device 12 may include a terminal communication unit 17, a terminal storage unit 18, a display unit 19, an input unit 20, and a terminal control unit 21.

The terminal communication unit 17 may include an interface that communicates with an external device wirelessly or by wire and transmits and receives information. For example, the terminal communication unit 17 may include a wireless communication module, a wireless LAN communication module, a wired LAN communication module, etc. corresponding to a mobile communication standard such as LTE (Long Term Evolution) (registered trademark). The terminal communication unit 17 can transmit and receive information to and from the server device 11 via the network 16.

For example, the terminal storage unit 18 may include a primary storage device and a secondary storage device. For example, the terminal storage unit 18 may include a semiconductor memory, a magnetic memory, an optical memory, etc. The terminal storage unit 18 may store various information and programs necessary for game processing. For example, the terminal storage unit 18 may store a part or all of the information on the user described above. For example, the part or all of the information may be exchanged with the server device 11 by the terminal control unit 21.

For example, the display unit 19 may include a display device such as a liquid crystal display, an organic EL display, etc. The display unit 19 can display various screens.

For example, the input unit 20 may include an input interface such as a touch panel provided integrally with the display unit 19. The input unit 20 can accept user input to the terminal device 12. In addition, the input unit 20 may include a physical key, or may further include an arbitrary input interface including a pointing device such as a mouse, etc.

The terminal control unit 21 may include at least one of one or more general-purpose processors that realize a specific function by reading a specific program and one or more dedicated processors specialized for specific processing. The terminal control unit 21 may control an operation of the entire terminal device 12.

The terminal control unit 21 may exchange information via the terminal communication unit 17. For example, the terminal control unit 21 may transmit and may receive information necessary for game processing to and from the server device 11. For example, the terminal control unit 21 may store information received from the server device 11 in the terminal storage unit 18.

The terminal control unit 21 may activate an application of the game according to an operation of the user. The terminal control unit 21 may cooperate with the server device 11 to execute game processing. For example, the terminal control unit 21 may display various screens on the display unit 19. For example, a graphical user interface (GUI) may be displayed on a screen. The terminal control unit 21 can detect a user operation on the screen.

Figure 2:
FIG. 2 is an exemplary embodiment of a diagram illustrating information on a user.

Looking next at the information that may, in some exemplary embodiments, be stored in the storage unit, FIG. 2 illustrates information 110 on an exemplary set of users including at least three users. For example, the information 110 on the user may be stored in the server storage unit 14 and shared and synchronized with the terminal device 12. The information 110 on the users may include various types of information unique to the user. In the present embodiment, the information 110 on the users may include a user ID and information on the cards possessed by the user 111 (see FIG. 3). In other words, the information 110 on the users may associate each of a plurality of users with the information on the cards possessed by each user 111.

The user ID may be information capable of uniquely identifying the user as described above.

The information on the cards possessed by a user 111 may include various types of information unique to the card possessed by the user in the game. When the card is acquired by the user, the acquired card may be associated with the user. In the present embodiment, the card may be a character card. Therefore, the information on the cards possessed by the user 111 may include information on a type and a characteristic of a character associated with the card. Here, the card may not be limited to the character card. FIG. 3 is an exemplary embodiment of a diagram illustrating details of the information on the cards possessed by a user 111. FIG. 3 illustrates an exemplary embodiment of information on the cards possessed by one user 111. The information on the cards possessed by the user 111 may include data related to a card ID, a character ID, a level, a rarity, an attribute, a parameter, and a unit skill ID. The information on the cards possessed by the user 111 may not be limited to including all of these data. In addition, the information on the cards possessed by the user 111 may further include other data.

The card ID may be an ID for uniquely identifying the card possessed by the user. In an example of FIG. 3, non-overlapping numbers may be used as card IDs. Hereinafter, a card whose card ID is 1 will be denoted by card 1.

The character ID may be an ID for uniquely identifying the character of the game. In the present embodiment, since the card may be a character card, one card ID may be associated with one character ID. In the example of FIG. 3, non-overlapping English letters may be used as character IDs. Hereinafter, a character whose character ID is A will be denoted by character A. Here, a plurality of cards may correspond to one character. In the example of FIG. 3, card 1 and card 20 may both be cards of character A.

The level may be information indicating a growth degree of the character. For example, as a value of the level increases, the growth degree of the character increases. For example, the value of the level influences a value of a parameter. In the example of FIG. 3, a level of character C may be 10. The value of the level rises as the user grows the character.

The rarity may be information indicating a degree of rarity of the card. For example, as a value of the rarity increases, the degree of rarity of the card increases. The rarity may be fixed. In addition, an initial value of the rarity may be determined according to the card, and the rarity may be changed according to the play of the game by the user. For example, the rarity may affect a maximum value of a parameter. In the example of FIG. 3, numbers may be used for rarity. For example, both card 1 and card 20 may be cards of character A. However, the degree of rarity of card 20 whose rarity is 4 may be higher than that of card 1 whose rarity is 2. Here, as another example, the rarity may be determined according to the character.

The attribute may be a characteristic related to a match, etc. possessed by the character and may be information indicating a superiority/inferiority relationship between characters. In the example of FIG. 3, fire, water, wind, light, etc. may be used as types of attributes. For example, a character having fire attribute may be resistant to attack from a character having wind attribute and may be vulnerable to attack from a character having water attribute.

The parameter may be information indicating strength of a character referenced in a match, etc. in the game. In the present embodiment, each character has parameters of HP, MP, AT and DF. Here, the parameters are not limited to HP, MP, AT and DF. For example, the parameters may further include a parameter related to a behavior of the game such as quickness. In addition, the parameters may not include some of HP, MP, AT and DF.

HP may be information indicating a hit point value of the character. In FIG. 3, a maximum value of HP may be shown. For example, when the character is damaged by an attacking action of the enemy character, HP may decrease by a damage amount. In addition, for example, due to a recovery action of the character, HP may increase by a recovery amount. In addition, when HP is not zero, the character may be in a battle-enabled state. For example, it may be possible to attack the enemy character. However, when HP decreases to zero, the character may be in a state of inability to battle. When HP of the character increases, it may be advantageous for completing the game content.

MP may be information indicating the magic point value of the character. In FIG. 3, a maximum value of MP may be shown. For example, when a special attack (hereinafter referred to as a "unit skill") different from a normal attack performed as a unit by the character is triggered, MP may decrease by a value corresponding to the unit skill. In addition, for example, due to the recovery action of the character, MP may increase by the recovery amount. When MP of the character increases, it may be advantageous for completing the game content.

AT may be information indicating attack power of the character. For example, AT may affect a damage amount given to the opponent by an attack of the character. As a value of AT increases, the damage amount given to the opponent may increase. Therefore, when AT of the character increases, it may be advantageous for completing the game content.

DF may be information indicating a defense force of the character. For example, DF may affect the amount of damage received by the character due to attack from the opponent. As a value of DF may increase, the amount of damage received from the opponent may decrease. Therefore, when DF of the character increases, it may be advantageous for completing the game content.

Here, the values of HP, MP, AT and DF of each character in FIG. 3 correspond to an example. HP, MP, AT and DF may be independent parameters, such that each of HP, MP, AT and DF can be independently set.

The unit skill ID may be an ID for uniquely identifying the unit skill possessed by the character of the card. The unit skill may be set for each card. Here, the unit skill may not be set for all cards. In other words, a card not having a unit skill may be present. In the present embodiment, a character displayed in a field area 191 (see FIG. 6) and operated by the user can trigger a unit skill in accordance with an instruction of the user. As mentioned above, MP may decrease due to triggering of the unit skill. When the value of MP is insufficient, the character may not trigger the unit skill. Hereinafter, a unit skill whose unit skill ID is S1 will be denoted by unit skill S1. For example, unit skill S1 may correspond to an attack in which character A gives medium damage having fire attribute to the entire enemy character. Further, for example, unit skill S20 may correspond to an attack in which character A gives extra-large damage having wind attribute to the entire enemy character. Here, as another example, the unit skill may be automatically triggered without an instruction of the user.

FIG. 4 may be a diagram illustrating an exemplary embodiment of information on a cooperation skill 112. Here, the cooperation skill may be a skill different from the unit skill, and may be a skill that is stochastically triggered at a predetermined timing when a plurality of predetermined characters is included in the deck. In the present embodiment, the information on a cooperation skill 112 may not be associated with one user, and may be applied in common to users participating in the game. The information on a cooperation skill 112 may be stored in the server storage unit 14 and may be shared and synchronized with the terminal device 12.

As illustrated in FIG. 4, in the present embodiment, the information on a cooperation skill 112 may include data related to a cooperation skill ID, a cooperation skill name, a target character, trigger timing, a trigger probability, an upper limit of the number of times of triggering, and an effect. The information on a cooperation skill 112 is not limited to including all of these data. In addition, the information on a cooperation skill 112 may further include other data.

The cooperation skill ID may be an ID for uniquely identifying the cooperation skill. In an example of FIG. 4, non-overlapping characters may be used as cooperation skill IDs. Hereinafter, a cooperation skill whose cooperation skill ID is CS1 will be denoted by cooperation skill CS1.

The cooperation skill name may be a name of the cooperation skill. For example, the cooperation skill name may be displayed on the display unit 19 when the cooperation skill is triggered. In the present embodiment, cooperation skill names may not overlap each other. Therefore, each of the cooperation skill names may correspond to a unique cooperation skill ID. Here, as another example, a plurality of cooperation skill IDs may correspond to one cooperation skill name.

The target character indicates a plurality of characters capable of triggering a cooperation skill. In the example of FIG. 4, the target character may be indicated using a character ID (see FIG. 3). In order for the cooperation skill to be triggered, the deck may need to include a combination of a plurality of predetermined characters. For example, in an exemplary embodiment, some of the target characters may need to be displayed in the field area 191 (see FIG. 6) as a user operation target, and all the other target characters need to be incorporated in the deck. For example, in order to trigger cooperation skill CS3, one of character C and character D may need to be displayed in the field area 191 (see FIG. 6) and operated by the user, and the other one may need to be incorporated in the deck. Here, the number of target characters may not be limited to two as long as a plurality of target characters is present. For example, with regard to cooperation skill CS2 of FIG. 4, the target characters correspond to three characters.

The trigger timing indicates a timing at which the cooperation skill may be triggered. In the example of FIG. 4, the trigger timing may be indicated using a game situation ID (see FIG. 5) described below. The trigger timing may be set for each of the cooperation skills. For example, cooperation skill CS2 can be triggered when the game is in one situation (situation in which the game situation ID may be set to C1). Further, for example, cooperation skill CS1 can be triggered when the game is in one of three situations (situation in which the game situation ID may be set to C1, C2 or C4).

The trigger probability indicates a probability that the cooperation skill is triggered. Each of the cooperation skills may be triggered according to a trigger probability set for each of the cooperation skills. For example, cooperation skill CS1 may be triggered at a probability of 50% when another trigger condition is satisfied. In addition, for example, cooperation skill CS20 may be triggered at a probability of 70% when another trigger condition is satisfied. For example, the terminal control unit 21 may store a rate at which the cooperation skill has been triggered in the past in the terminal storage unit 18.

Then, for example, when another trigger condition is satisfied, the terminal control unit 21 may read a rate of triggering in the past and determine whether to trigger the cooperation skill. At the time of determination, the terminal control unit 21 may perform calculation using random numbers. Further, the rate, at which the cooperation skill has been triggered in the past, stored in the terminal storage unit 18 may be shared with the server device 11.

The upper limit of the number of times of triggering indicates an upper limit of the number of times that the game allows triggering of the cooperation skill. In the present embodiment, triggering of the cooperation skill exceeding the upper limit of the number of times may not be allowed. In this example of FIG. 4, the upper limit of the number of times of triggering of cooperation skill CS1 corresponds to 1. In addition, for example, the upper limit of the number of times of triggering of cooperation skill CS3 corresponds to 2. For example, the terminal control unit 21 may retrieve the number of times of triggering of the cooperation skill stored in the terminal storage unit 18, etc. and determine whether the number exceeds the upper limit of the number of times of triggering. For example, the number of times of triggering of the cooperation skill stored in the terminal storage unit 18 may be reset (set to 0) when game content capable of triggering the cooperation skill ends. In addition, the number of times of triggering of the cooperation skill stored in the terminal storage unit 18 may be shared with the server device 11.

The effect of the cooperation skill may be some kind of an effect on the game when the cooperation skill is triggered. For example, the effect of the skill may be that a parameter of a character to be operated by the user is changed. One specific example of such an effect may include recovery of HP of the character. A recovery amount of HP may be a fixed value or a value determined by a predetermined ratio with respect to a maximum value. In addition, the effect may not be limited to one item. For example, the effect may mean that HP of the character to be operated by the user may be recovered and another character fights against the enemy character. In addition, as another specific example of the effect, the value of AT or DF of the character to be operated by the user may be increased. Here, the value of AT or DF may be increased by a fixed time (for example, 10 seconds). In addition, a target of the effect may correspond to an enemy character. For example, the effect may mean that a parameter such as HP of the enemy character is decreased. In addition, the target of the effect may correspond to a game field. For example, the effect may mean that an obstacle preventing the attack of the enemy character is generated. In addition, for example, the effect may mean that a terrain is changed so that it is easy to take the back of the enemy.

Here, among items shown in FIG. 4, the target character, the trigger timing, the trigger probability, and the upper limit of the number of times of triggering may be related to a trigger condition of the cooperation skill. In the present embodiment, the cooperation skill may be triggered according to the trigger probability when a condition related to the target character, the trigger timing, and the upper limit of the number of times of triggering may be satisfied. For example, cooperation skill CS1 may be triggered at a probability of 50% when the number of times of triggering does not exceed one which may be the upper limit of the number of times of triggering, characters A and B which may be target characters may be included in the deck as one of the characters to be operated by the user, and a predetermined trigger timing may be satisfied.

Figure 5:
FIG. 5 is an exemplary embodiment of a diagram illustrating game situation information.

FIG. 5 may be a diagram illustrating an exemplary embodiment of game situation information 113. As shown in FIG. 5, in the present embodiment, the game situation information 113 may indicate a correspondence between the game situation ID and the content (game situation). FIG. 5 shows an example in which at least five game situations may be associated with game situations ID. For example, the game situation information 113 may be stored in the server storage unit 14 and may be shared and synchronized with the terminal device 12. Here, only some of the five game situations of FIG. 5 may be associated with game situations ID. Further, another game situation may be associated with the game situation ID.

Hereinafter, a game situation in which the game situation ID may be C1 will be denoted by game situation C1. Game situation C1 may correspond to a situation in which the character to be operated by the user is in a state of inability to battle (HP is zero). Game situation C2 may correspond to a situation in which the character to be operated by the user has achieved six combos (6 consecutive attacks). Game situation C3 may correspond to a situation in which that the character to be operated by the user has triggered the unit skill. Game situation C4 may correspond to a situation in which that the character to be operated by the user has executed the counter attack on the enemy character. Game situation C5 may correspond to a situation in which that a team attack button 32 (see FIG. 6) described below may be tapped by the user and the team attack may be executed.

For example, cooperation skill CS1 (see FIG. 4) sets the trigger timing to game situation C1, C2 or C4. Cooperation skill CS1 can be triggered at a timing at which the character to be operated by the user is in a state of inability to battle, the six combos have been achieved, or the counter attack has been executed on the enemy character. Further, for example, cooperation skill CS3 (see FIG. 4) sets the trigger timing to game situation C3, C4, or C5. Cooperation skill CS3 can be triggered at a timing at which the character to be operated by the user triggers the unit skill, the counter attack is executed on the enemy character, or the team attack is executed.

Figure 6:
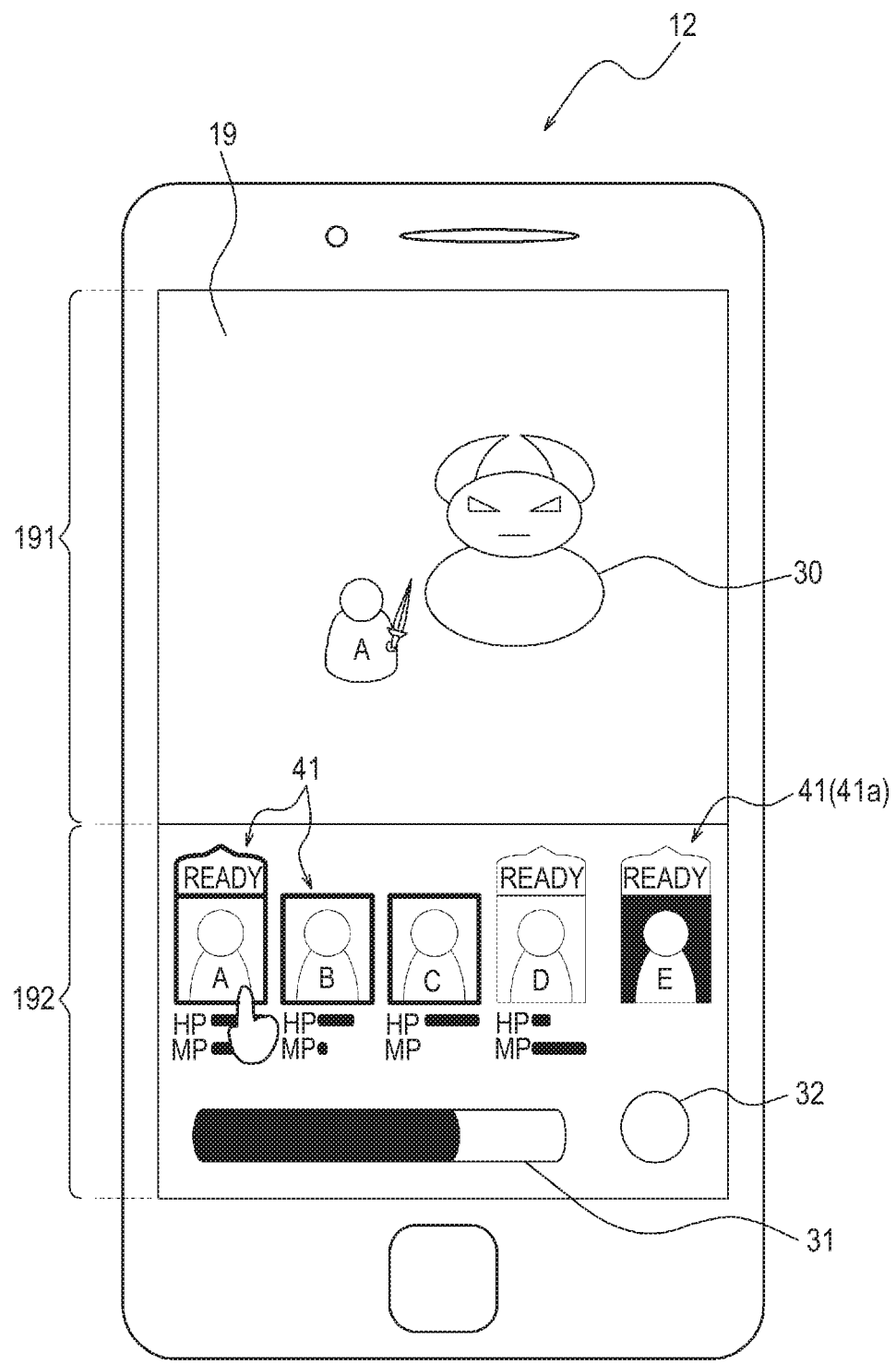
FIG. 6 is an exemplary embodiment of a diagram illustrating a screen of game content for performing a battle.

Looking next at an example screen display for the game, FIG. 6 may be a diagram illustrating an exemplary embodiment of a screen of game content for performing a battle using a plurality of characters of a deck. The screen of the game content may be displayed on the display unit 19 of the terminal device 12 operated by the user. This game content may be a match against an enemy character, and may be incorporated in, for example, a game scenario. As another example, this game content may be a period-limited event prepared separately from the game scenario.

As illustrated in FIG. 6, this game content screen may include a field area 191 and an area 192 other than the field. The field area 191 may be an area for displaying a virtual game space. For example, an enemy character 30 and character A to be operated by the user may be displayed in the field area 191.

In addition, the area 192 other than the field may be an area for displaying an image related to a user operation. For example, a team attack gauge 31, the team attack button 32 and a card character icon 41 included in the deck may be displayed in the area 192 other than the field. The icon 41 may be an example of an image associated with a plurality of game media (characters included in the deck). Here, the deck may include cards other than those owned by the user. Here, an icon 41a among icons 41 may be an image associated with the helper character. In an example of FIG. 6, the icon 41a among the icons 41 may have a different background color from the others. Therefore, the user can easily determine that character E may be a helper character.

In the example of FIG. 6, the user may execute game content that carries out battle using a character of the deck. The user may operate character A displayed in the field area 191 to proceed with the game (that is, performs a battle with the enemy character 30). By tapping the icon 41, the user can switch the character to be operated displayed in the field area 191. A tab portion written as "READY" may be displayed on the icon 41 of the character capable of triggering the unit skill. The user can trigger the unit skill by sliding the tab portion upward (in a direction toward the field area 191). MP of the character triggering the unit skill may be consumed. However, the helper character can trigger the unit skill only once during battle without consuming MP. When all of the four characters A to D excluding the helper character are in a state of inability to battle, the game content ends.

Here, in this game content, the number of operable characters displayed in the field area 191 may be limited (one in the present embodiment). For example, in a screen having a limited area such as a mobile terminal, when a large number of characters are present on the field, the characters may be shaded by a finger or a stylus, and it may be difficult for the user to identify the character to be operated. In addition, the user may find it to be hard to perform the game operation. Therefore, except for special cases such as the cooperation skill, the team attack, etc., display of characters that are not to be operated on the field area 191 may be restricted. In addition, operable characters can be switched by the user. In this way, visibility and operability may be improved by limiting the number of operable characters displayed in the field area 191 while allowing operable characters to be switched. In addition, as described below, when the cooperation skill is executed, the user can automatically and indirectly operate characters that have been designated as non-operable characters. In other words, the user can avoid decreasing their chances of operating some characters included in the deck. In addition, when the cooperation skill is triggered, the user can operate various characters without damaging operability of the user even in a user interface in which a complicated input operation is difficult to perform such as a touch panel.

In addition, in the example of FIG. 6, a value of the team attack gauge 31 may increase when the enemy character 30 is attacked. When the value of the gauge 31 reaches a predetermined value (for example, when the gauge 31 is filled), the user may tap the team attack button 32 to display the four characters A to D except for the helper character in the field area 191, thereby battling with the enemy character 30. In this instance, the user may operate only one character (for example, character A) in the set of characters to be operated. Other characters (for example, characters B to D) may be automatically operated by the game program. When a team attack is triggered, the team attack gauge 31 may become zero. Here, the team attack gauge 31 may be increased when a predetermined condition is satisfied. That is, the predetermined condition is not limited to attacking the enemy character 30. For example, the team attack gauge 31 may be increased when the character to be operated is attacked as the predetermined condition. Further, for example, the team attack gauge 31 may be increased when the user acquires or uses a predetermined item in the game.

An exemplary embodiment of an execution screen in which a cooperation skill is shown may next be provided. Here, in the present embodiment, when the condition related to the target character, the trigger timing, and the upper limit of the number of times of triggering is satisfied, the cooperation skill may be stochastically triggered. For example, character A may be in a state of inability to battle during execution of the game content (see FIG. 8). In such a case, it may be determined whether to trigger the cooperation skill including character A as the target character. In the present embodiment, the server device 11 or the terminal device 12 may perform a process related to the cooperation skill as described below. Here, the terminal device 12 and the server device 11 may cooperate to perform the process related to the cooperation skill. In the exemplary embodiment described below with reference to FIGS. 7 to 10, a case in which the terminal device 12 may perform the process related to the cooperation skill will be described as an example.

The terminal device 12 may detect that character A is in a state of inability to battle. Here, the terminal device 12 may share and synchronize the information on a cooperation skill 112 and the game situation information 113 with the server device 11. For example, the terminal device 12 may extract a candidate that can be triggered as the cooperation skill based on the information on a cooperation skill 112 and the game situation information 113.

FIG. 7 may be a diagram describing an exemplary embodiment of a process of extracting a candidate for the cooperation skill. The terminal device 12 may extract a cooperation skill including character A as the target character and having a state of inability to battle (C1) as the trigger timing. Further, the terminal device 12 may extract the cooperation skill under the condition that all the target characters are included in the deck. In this example, as illustrated in FIG. 6, the deck may include characters A to E. Further, the terminal device 12 may extract cooperation skills CS1, CS2, and CS20. The terminal device 12 sets an order of priority ((1) to (3) in an example of FIG. 7) for extracted cooperation skill candidates. Here, in the present embodiment, the order of priority may be set in an order of cooperation skill IDs.

The terminal device 12 may determine whether to trigger the cooperation skill according to the order of priority. The terminal device 12 may perform calculation using information of the trigger probability of 50%, a past trigger situation of cooperation skill CS1, etc. In the example of FIG. 7, the terminal device 12 may determine not to trigger cooperation skill CS1 and may proceed to subsequent determination of cooperation skill CS2. Then, the terminal device 12 may perform calculation using information of the trigger probability of 20%, a past trigger situation of cooperation skill CS2, etc. In the example of FIG. 7, the terminal device 12 may determine to trigger cooperation skill CS2 and may not perform subsequent determination (for example, determination of cooperation skill CS20). Here, in this example, the number of times of triggering of each cooperation skill may be smaller than the upper limit of the number of times that those skills may be triggered. However, when there is a cooperation skill that reaches the upper limit of the number of times those skills may be triggered, the terminal device 12 may determine not to trigger the cooperation skill. Then, the terminal device 12 may proceed to determination of a cooperation skill having a subsequent order of priority. For example, when cooperation skill CS2 has reached the upper limit of the number of times of triggering, the terminal device 12 may determine not to trigger cooperation skill CS2 and may proceed to subsequent determination of cooperation skill CS20.

Figure 8:
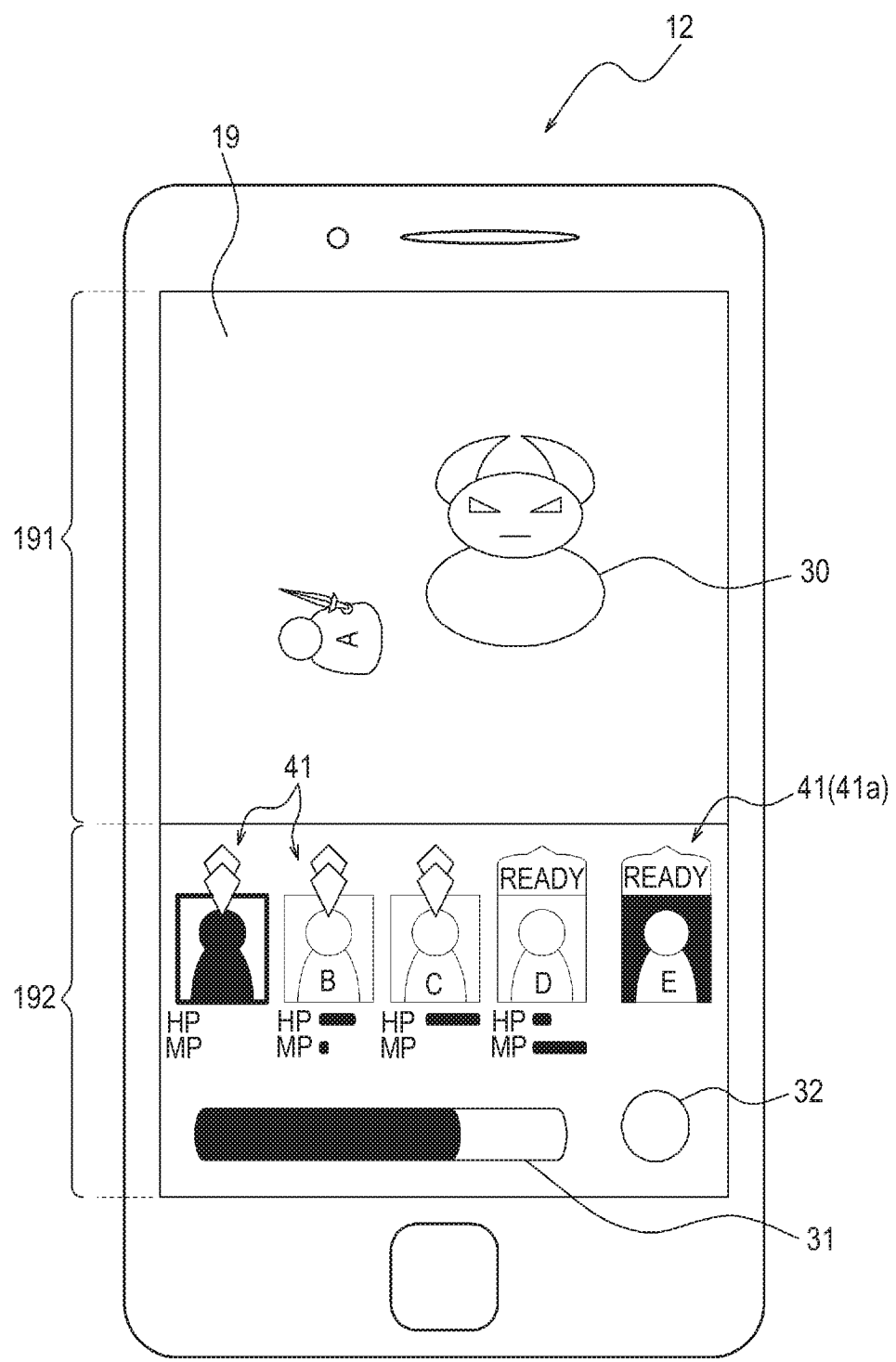
FIG. 8 is an exemplary embodiment of a diagram illustrating a screen when triggering of the cooperation skill is determined.

FIG. 8 may be a diagram illustrating an exemplary embodiment of a screen when character A to be operated by the user may be in a state of inability to battle, and the terminal device 12 may determine to trigger cooperation skill CS2. Elements illustrated in FIG. 8 may be the same as those of FIG. 7. Therefore, the same description as that of FIG. 7 will be appropriately simplified or omitted.

In the example of FIG. 8, character A, as illustrated in the field area 191, may be presented as having collapsed. In addition, the icon 41 corresponding to character A o may be displayed in black. For this reason, the user may detect that character A is in a state of inability to battle. The terminal device 12 may determine that it is appropriate to trigger cooperation skill CS2, and may perform a rendering process of displaying characters A to C (target characters of cooperation skill CS2) among icons 41 in a different mode from that of the other characters D and E. In the example of FIG. 8, special figures (overlapping rectangles) may be displayed only on the icons 41 of characters A to C. The special figures may blink or change in color.

Figure 9:
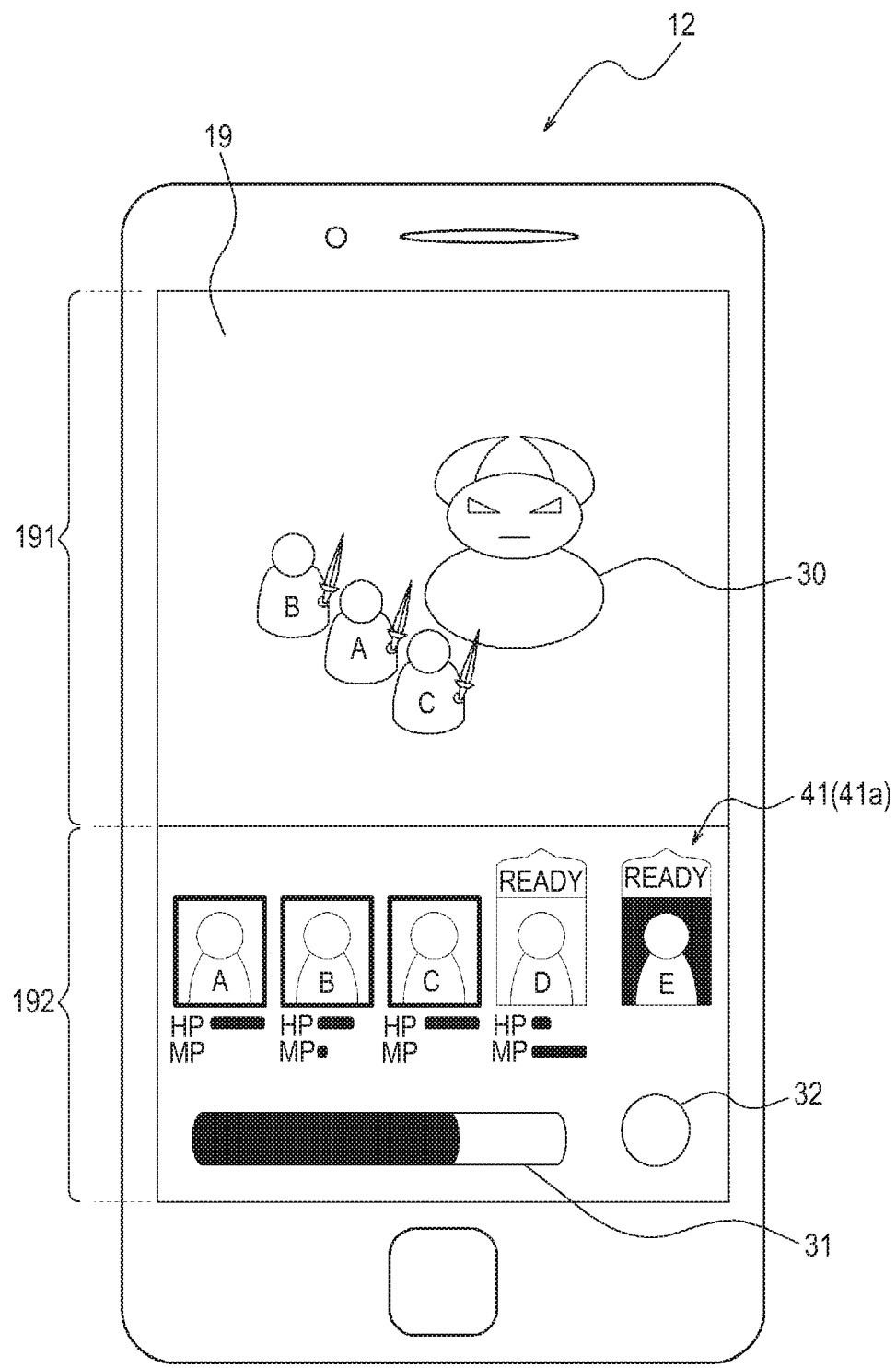
FIG. 9 is an exemplary embodiment of a diagram illustrating a screen at the time of triggering the cooperation skill.

FIG. 9 may be a diagram illustrating an exemplary embodiment of a screen on which the terminal device 12 has triggered cooperation skill CS2. The screen of FIG. 9 may be displayed following the screen of FIG. 8. Elements illustrated in FIG. 9 may be the same as those of FIG. 7 and FIG. 8. Therefore, the same description as that of FIG. 7 and FIG. 8 will be appropriately simplified or omitted.

The terminal device 12 may change HP of character A (recovering from zero), and further may perform a rendering process in which character B and character C fight against the enemy character 30 together with character A. In an example of FIG. 9, character A, which may have recovered and may be in the battle-enabled state, may be displayed in the field area 191. In addition, character B and character C may be displayed in the field area 191. Subsequently to FIG. 8, the terminal device 12 may automatically execute a process of FIG. 9 (without requiring an instruction of the user). In the example of FIG. 9, a cooperation skill may be executed such that character B and character C cause character A to recover and then fight together when character A is in a state of inability to battle. For this reason, a rendering process suitable for the game situation may be performed by the cooperation skill.

Figure 10:
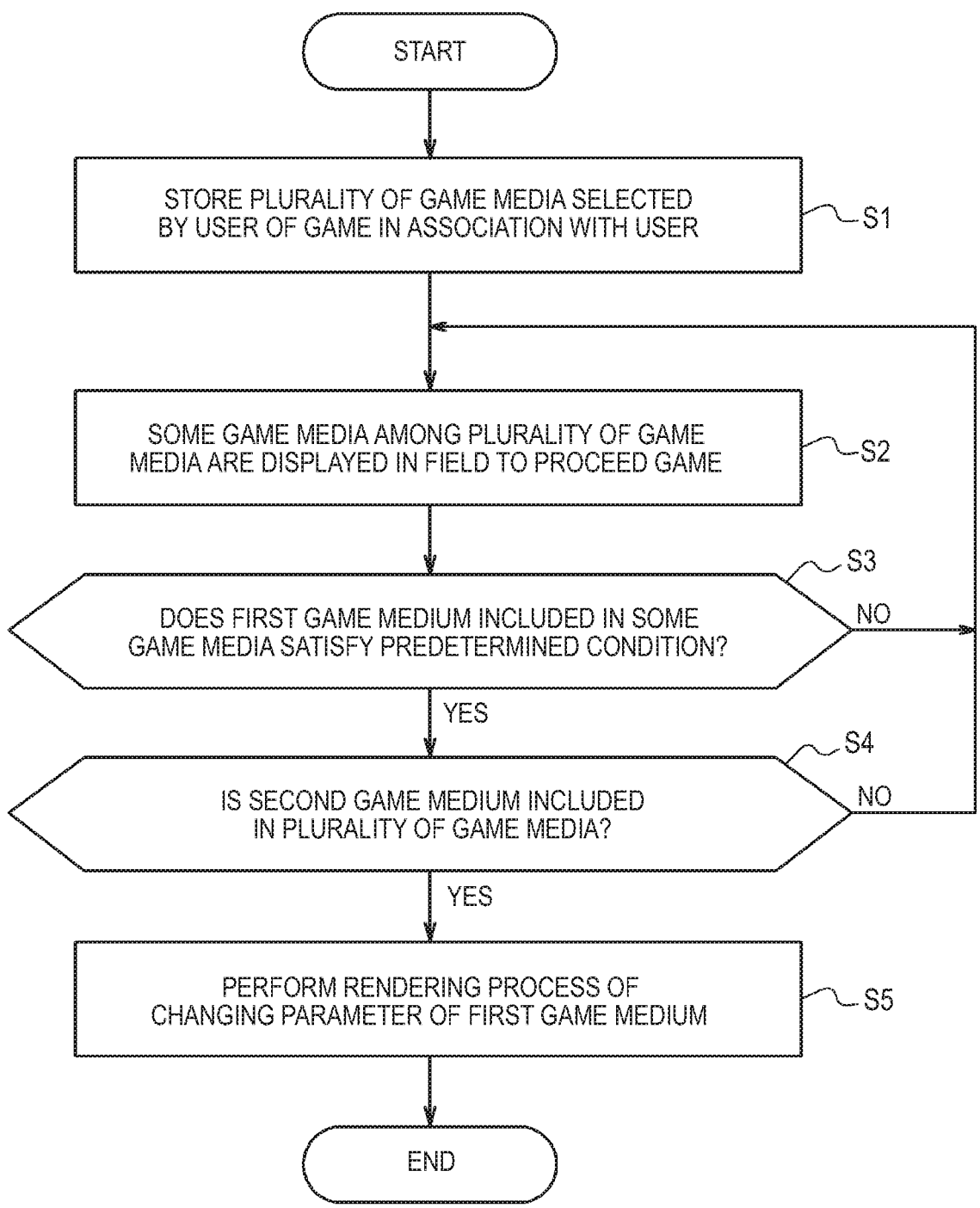
FIG. 10 is an exemplary embodiment of a flowchart illustrating a control method of executing a process related to the cooperation skill.

A flowchart illustrating an exemplary embodiment of a control method may next be illustrated. FIG. 10 may be a flowchart illustrating an exemplary embodiment of a control method related to the cooperation skill executed by the terminal device 12. The user may construct a deck using a game medium and execute game content for playing a match. This flowchart may show processing of the terminal device 12 in such game content. Here, the game medium in description of the following flowchart may specifically correspond to a card or a character associated with the card.

First, the terminal device 12 may store a plurality of game media selected by the user of the game in association with the user (step S). As a specific example, the plurality of game media may correspond to characters selected by the user and included in the deck. For example, the terminal device 12 may read the information 110 on the user and the information on the cards possessed by the user 111 from the terminal storage unit 18. The terminal device 12 may extract the card ID or the character ID of the character included in the deck from the card information 111. The terminal device 12 may associate the extracted card ID or character ID with the user ID obtained from the information 110 on the users, and store the card ID or character ID in the terminal storage unit 18 as deck information. In addition, the deck information may be shared and synchronized with the server device 11.

The terminal device 12 may cause some game media among the plurality of game media to be displayed in the field and may proceed the game (step S2). Here, for example, some game media correspond to a character to be operated by the user. Some game media may not be limited to one character, and may be, for example, a plurality of characters.

The terminal device 12 may determine whether a first game medium included in some game media satisfies a predetermined condition (step S3). In the example of FIG. 6, some game media and the first game medium may correspond to characters A. Further, the predetermined condition may be a condition related to the first game medium among trigger conditions of the cooperation skill. In the example of FIG. 6, the predetermined condition may be that character A is included in the target character of the cooperation skill and the trigger timing may be satisfied by character A (see FIGS. 4 and 5). Here, in the example of FIG. 6, one first game medium may be used. However, a plurality of first game media may be used.

When the first game medium satisfies the predetermined condition, the terminal device 12 may proceed to the process of step S4 (Yes in step S3). Further, when the first game medium does not satisfy the predetermined condition, the terminal device 12 may return to the process of step S2 (No in step S3).

The terminal device 12 may determine whether a second game medium may be included in a plurality of game media (for example, characters included in the deck) (step S4). Unlike the first game medium, the second game medium may not be included in some game media (for example, a character to be operated by the user). In addition, the second game medium may have a predetermined relationship with the first game medium. Specifically, both the second game medium and the first game medium may correspond to target characters of the cooperation skill. Here, one second game medium may be used. However, a plurality of second game media may be used. In the example of FIG. 9, two characters B and C may correspond to the second game medium.

When the second game medium is included in the plurality of game media, the terminal device 12 may proceed to the process of step S5 (Yes in step S4). Further, when the second game medium is not included in the plurality of game media, the terminal device 12 may return to the process of step S2 (No in step S4).

The terminal device 12 may extract a candidate that can be triggered as the cooperation skill (for example, see FIG. 7). Then, the terminal device 12 may set an order of priority for the extracted cooperation skill. Then, according to the order of priority, the terminal device 12 may trigger a cooperation skill not reaching the upper limit of the number of times that the skill can be triggered according to a trigger probability. The terminal device 12 may perform a cooperation effect process including changing at least a parameter of the first game medium by triggering the cooperation skill (step S5). For example, as a cooperation effect, for example, as illustrated in FIG. 9, the terminal device 12 may recover HP of character A and may put character A in the battle-enabled state.

Here, the cooperation effect may include at least a change of a parameter of the first game medium in response to triggering of the cooperation skill, and further may include various changes and rendering based on triggering of the cooperation skill. For example, it may be presumed that the effect associated with cooperation skill CS3 may fully recover MP of the first game medium and may halve HP of the enemy character 30. The cooperation effect may include not only fully recovering MP of the first game medium but also halving HP of the enemy character 30 when cooperation skill CS3 is triggered. In addition, for example, as illustrated in FIG. 9, the cooperation effect may include causing characters B and C to fight against the enemy character. Further, for example, as illustrated in FIG. 8, the cooperation effect may include displaying special figures on the icons 41 of characters A to C.

As described above, the information processing apparatus according to the present embodiment may include a storage unit (for example, the terminal storage unit 18) that may store a plurality of game media (for example, characters) selected by the user of the game in association with the user. Further, the information processing apparatus according to the present embodiment may include a control unit (for example, the terminal control unit 21). The control unit may display some game media among a plurality of game media in the field area 191 and may proceed with the game content. Then, the control unit may determine whether the first game medium (for example, character A) included in some game media (for example, a character to be operated by the user) satisfies a predetermined condition. The control unit further may determine whether the plurality of game media includes the second game medium (for example, characters B and C) which may be in a predetermined relationship with the first game medium and may not be included in some game media. When a condition related to the first game medium and the second game medium is satisfied, the control unit may perform the cooperation effect process including changing a parameter of the first game medium. The information processing apparatus according to the present embodiment can improve excitement of the game by the cooperation skill executed according to the scenario (story) or the game situation in the game.

Even though the present disclosure has been described based on the drawings and embodiments, it should be noted that those skilled in the art can easily make various variations and modifications based on the present disclosure. Therefore, it should be noted that these variations and modifications may be included within the scope of the present disclosure. For example, functions, etc. included in each means, each step, etc. can be relocated so as not to be logically contradictory, and a plurality of means or steps etc. can be combined into one or divided.

Some exemplary embodiments of variations and modifications which may be contemplated may be provided as follows. In the above embodiment, the cooperation skill may be treated as the ability previously possessed by the target character. However, the cooperation skill may also be treated as the ability acquired with a growth of the target character. For example, when a specific quest is completed using a deck including all target characters that would be required to perform the cooperation skill, the ability of the target character to trigger the cooperation skill may be acquired for the first time. In addition, the cooperation skill may grow. Here, the growth of the cooperation skill refers to change of the effect or generation of an additional effect (for example, acquisition of ability). For example, the damage to the enemy character 30 due to the cooperation skill may be increased according to the growth of the target character. Further, a parameter (hereinafter referred to as an "association parameter") for associating target characters with each other may be set. For example, the association parameter may include a degree of intimacy between the target characters. In addition, the association parameter may include a level (cooperation skill level) indicating a growth degree of the cooperation skill. For example, the cooperation skill level may be increased by the number of times that the cooperation skill has been triggered. In addition, the cooperation skill level may rise according to the growth of the target character. Further, for example, the damage to the enemy character 30 due to the cooperation skill may be increased using a special item.

In a process of extracting the candidate that can be triggered as the cooperation skill of the above embodiment, the order of priority may be set as the order of cooperation skill IDs. Here, for example, the order of priority may correspond to a sort order of cooperation skill names, a descending order of the trigger probability, an order of strength of the effect (for example, a descending order of damage to the enemy character 30, etc.), a descending order of the remaining number of times up to the upper limit of the number of times of triggering, etc. In addition, adjustment may be performed such that the order of priority of the cooperation skill may increase as the degree of intimacy between the target characters of the cooperation skill increases. In addition, the order of priority may be determined based on a parameter of the target character (for example, a total value of levels, a total value of ATs, etc.).

In addition, in the above embodiment, one cooperation skill may have been triggered. For this reason, in the case of determining that one cooperation skill should be triggered, the terminal device 12 may not have determined a cooperation skill having a lower order of priority than that of the cooperation skill. However, even when the terminal device 12 determines that one cooperation skill should be triggered, the terminal device 12 may continue to determine the cooperation skill having a lower order of priority than that of the cooperation skill that had just been triggered. In this instance, all candidate cooperation skills may be stochastically triggered. In addition, an upper limit of the number of continuous triggers of the triggered cooperation skill (for example, three) may be set, and the terminal device 12 may continue to determine the cooperation skill having the lower order of priority when the upper limit of the number of continuous triggers may not be exceeded. In this instance, the candidate cooperation skill may be stochastically triggered up to a maximum of the upper limit of the number of continuous triggers. Alternatively, all candidate cooperation skills may be triggered. That is, a probability of triggering all the cooperation skills may be 100%. In addition, when triggering is not stochastically performed, one or a plurality of cooperation skills having a high order of priority among candidate cooperation skills may be triggered.

In addition, in the above embodiment, the cooperation skills may include a lot of types. As another cooperation skill, in the case of game situation C2 (the character to be operated by the user achieves six combos), a process in which all target characters battle with the enemy character 30 may be executed. In addition, as another cooperation skill, in the case of game situation C3 (the character to be operated by the user may trigger the unit skill), a process in which remaining target characters trigger the unit skill may be executed. In addition, as another cooperation skill, in the case of game situation C5 (execution of team attack), a process in which all characters including the helper character battle with the enemy character 30 may be executed. Here, the number of target characters may not be limited to two or three as illustrated in FIG. 4, and may be four or five or more.

In addition, the character to be operated may be changeable while the cooperation skill may be executed. For example, it may be presumed that character A, to be operated by the user, may be displayed in the field area 191. When cooperation skill CS1 using character A as one target character is triggered, character B may be displayed in the field area 191. Here, when the user switches the operation target to character B, character A may become an NPC and may be displayed in the field area 191, and cooperation skill CS1 may be continued. Further, when cooperation skill CS1 ends, character B may remain on the field area 191 and may be operated by the user, and character A may not be displayed in the field area 191. That is, when an execution time of the cooperation skill elapses and the cooperation skill ends, only the character to be operated may be displayed in the field area 191 at the end of the cooperation skill, and the other target characters may not be displayed in the field area 191.

Further, in the above embodiment, a parameter (for example, MP) has may not have been consumed (for example, a parameter value may have not been decreased) to trigger the cooperation skill. However, a parameter (for example, MP) may be consumed when the cooperation skill may be triggered. In addition, a unique parameter (for example, MP for the cooperation skill, hereinafter referred to as "cooperation MP") consumed to trigger the cooperation skill may be provided to each character. In this instance, when the cooperation skill is triggered, the cooperation MP of the target character may be consumed by a value corresponding to the cooperation skill. For example, when at least one cooperation MP of the target character may be smaller than a value consumed by each character (hereinafter referred to as "consumed cooperation MP"), the cooperation skill may not be triggered. In addition, for example, even in a case in which at least one cooperation MP of the target character is smaller than the consumed cooperation MP, when a total value of cooperation MPs of all target characters is larger than a total consumed cooperation MP, the cooperation skill may be triggered. For example, it may be presumed that when cooperation skill CS1 is triggered, the consumed cooperation MP of each of character A and character B may be 5 (summed consumed cooperation MP may be 10). When cooperation MP of character A is 3, the cooperation skill may not be triggered on the assumption that consumed cooperation MP may be not satisfied. As another example, when cooperation MP of character B may be 7 or more (larger than the total consumed cooperation MP), the cooperation skill may be triggered by character B sharing consumed cooperation MP corresponding to a deficiency of character A. In this instance, with regard to triggering of the cooperation skill, a value of cooperation MP of each character need not to be specifically checked simultaneously with an increase in strategic characteristic of the user, and thus it may be possible to reduce the burden of this process on the operation of the game. In particular, in a compact liquid crystal such as a mobile terminal, visibility of a parameter of each character may be low, and thus the cooperation skill may be easily triggered without specifically detecting each parameter. In addition, the consumed cooperation MP may be determined for all target characters rather than for each character. That is, only the total consumed cooperation MP may be determined. For example, when the total consumed cooperation MP is 12, the consumed cooperation MP of each character in triggering of cooperation skill CS1 (two target characters may be present) may be 6. In addition, for example, the consumed cooperation MP of each character in triggering of cooperation skill CS2 (three target characters may be present) may be 4.

In addition, in the above embodiment, a part of a game screen may be web-displayed so as to be displayed on the display unit 19 of the terminal device 12 based on data generated by the server device, and a part of the game screen may be native-displayed so as to be displayed by a native application installed in the terminal device 12. In this way, the game in the above-described embodiment may be a hybrid game in which each of the terminal device 12 and the server device 11 takes charge of a part of processing. Further, the server device 11 and the terminal device 12 may not share and synchronize all data such as the information on a cooperation skill 112. As an example, the data shared and synchronized by the server device 11 and the terminal device 12 may only correspond to the information on a cooperation skill 112 and information about an object acquired by the user (for example, information about a target character owned by the user). In this instance, the other information may be stored in the storage unit (the server storage unit 14 or the terminal storage unit 18) of the information processing apparatus (the server device 11 or the terminal device 12) which may execute game processing based on the information. For example, when all game processing based on the other information may be executed by the terminal device 12, the other information may be stored only in the terminal storage unit 18.

In addition, for example, a computer, a mobile phone, etc. may be suitably used to function as the terminal device 12 or the server device 11. The terminal device 12 or the server device 11 can be realized by storing a program describing processing content for realizing each of the above-described functions in an accessible storage unit, and reading and executing the program by the CPU.

REFERENCE NUMBERS 10 game system
11 server device
12 terminal device
13 server communication unit
14 server storage unit
server control unit
16 network 17 terminal communication unit
18 terminal storage unit
19 display unit
20 input unit
21 terminal control unit
30 enemy character
31 gauge
32 team attack button
41, 41a icon
110 information on users
111 information on the cards possessed by a user
112 information on a cooperation skill
113 game situation information
191 field area
192 area other than field

What is claimed is:

1. A non-transitory computer-readable medium embodying program code that, when executed, causes an information processing apparatus executing a process of a game including game content for performing a battle using a plurality of battle-participating game media to execute:
a step of storing the plurality of battle-participating game media selected by a user of the game in association with the user;
a step of displaying at least one displayed game media among the plurality of battle-participating game media in a field area and proceeding with the game content for performing the battle;
a step of performing a process to provide a cooperation effect, wherein performing the process to provide the cooperation effect comprises determining whether a first game medium satisfies a predetermined condition, said first game medium included in the plurality of battle-participating game media and in the at least one displayed game media, and determining whether a second game medium having a predetermined relationship with the first game medium is included in the plurality of battle-participating game media, wherein said second game medium is not displayed in the field area; and
a step of changing of a parameter of the first game medium when the first game medium satisfies the predetermined condition and the second game medium is included in the plurality of battle-participating game media.

2. The non-transitory computer-readable medium according to claim 1, wherein the predetermined condition is that the first game medium is in a state of inability to battle in the game content.

3. The non-transitory computer-readable medium according to claim 2, wherein the step of performing the process to provide the cooperation effect further comprises, with the second game medium, putting the first game medium in a battle-enabled state in the game content.

4. The non-transitory computer-readable medium according to claim 1, wherein the step of performing the process to provide the cooperation effect further comprises, with the second game medium, performing a battle together with the first game medium in the game content.

5. The non-transitory computer-readable medium according to claim 1, further causing the information processing apparatus to execute
a step of displaying an image associated with the plurality of battle-participating game media in an area other than the field area,
wherein the step of providing the cooperation effect includes displaying an image associated with the first game medium and the second game medium in a different mode from a mode of an image associated with a remainder of the plurality of battle-participating game media except for the first game medium and the second game medium.

6. The non-transitory computer-readable medium according to claim 1, further causing the information processing apparatus to execute
a step of selecting one of a plurality of cooperation skill candidates extracted according to a combination of the first game medium and the second game medium,
wherein the step of performing the process to provide the cooperation effect includes an effect associated with one selected cooperation skill.

7. The non-transitory computer-readable medium according to claim 6, wherein an order of priority is set for each of the plurality of cooperation skill candidates.

8. The non-transitory computer-readable medium according to claim 6, wherein a probability is set for each of the plurality of cooperation skill candidates, and one of the plurality of cooperation skill candidates is selected according to the probability.

9. A method of controlling an information processing apparatus executing a process of a game including game content for performing a battle using a plurality of battle-participating game media, the method comprising:
a step of storing the plurality of battle-participating game media selected by a user of the game in association with the user;
a step of displaying at least one displayed game media among the plurality of battle-participating game media in a field area and proceeding with the game content for performing the battle;
a step of performing a process to provide a cooperation effect, wherein performing the process to provide the cooperation effect comprises determining whether a first game medium satisfies a predetermined condition, said first game medium included in the plurality of battle-participating game media and in the at least one displayed game media, and determining whether a second game medium having a predetermined relationship with the first game medium is included in the plurality of battle-participating game media, wherein said second game medium is not displayed in the field area; and
a step of changing of a parameter of the first game medium when the first game medium satisfies the predetermined condition and the second game medium is included in the plurality of battle-participating game media.

10. An information processing apparatus configured to execute a process of a game including game content for performing a battle using a plurality of battle-participating game media, the information processing apparatus comprising:
a storage unit configured to store the plurality of battle-participating game media selected by a user of the game in association with the user; and
a control unit,
wherein the control unit is configured to perform the steps of:
displaying at least one displayed game media among the plurality of battle-participating game media in a field area and proceeding with the game content for performing the battle,
performing a process for providing a cooperation effect, wherein performing the process for providing the cooperation effect comprises determining whether a first game medium satisfies a predetermined condition, said first game medium included in the plurality of battle-participating game media and in the at least one displayed game media, and determining whether a second game medium having a predetermined relationship with the first game medium is included in the plurality of battle-participating game media, wherein said second game medium is not displayed in the field area, and a process of changing of a parameter of the first game medium when the first game medium satisfies the predetermined condition and the second game medium is included in the plurality of battle-participating game media.

* * * * *